United States Patent [19]

Fuehrer et al.

[11] Patent Number: 4,741,422

[45] Date of Patent: May 3, 1988

[54] CLUTCH ASSEMBLY WITH A PRESSURE BALANCE CHAMBER

[75] Inventors: Reece R. Fuehrer, Danville; Donald Klemen, Carmel; James C. Polak, Indianapolis, all of Ind.

[73] Assignee: General Motors Corporation, Detroit, Mich.

[21] Appl. No.: 23,540

[22] Filed: Mar. 9, 1987

[51] Int. Cl.⁴ .................... F16D 25/063; F16D 25/10; F16D 25/12

[52] U.S. Cl. .................... 192/87.11; 192/106 F

[58] Field of Search ........... 192/106 F, 87.1, 87.11, 192/87.12, 87.13, 87.14, 87.15

[56] References Cited

U.S. PATENT DOCUMENTS

| | | | |
|---|---|---|---|
| Re. 27,937 | 3/1974 | Hensel | 192/87.11 |
| 2,726,748 | 12/1955 | Quistgaard et al. | 192/106 F X |
| 3,064,780 | 11/1962 | Richards et al. | 192/106 F X |
| 3,138,964 | 6/1964 | Stockton | 192/87.15 X |
| 3,215,237 | 11/1965 | Davies et al. | 192/106 F X |
| 3,360,087 | 12/1967 | Hilpert | 192/106 F X |
| 3,365,985 | 1/1968 | Johnson | 192/87.11 X |
| 3,581,858 | 6/1971 | Haley | 192/106 F |
| 3,669,233 | 6/1972 | Kraus et al. | 192/87.11 |
| 3,746,138 | 7/1973 | Forster et al. | 192/87.11 |

FOREIGN PATENT DOCUMENTS

| | | | |
|---|---|---|---|
| 898240 | 11/1953 | Fed. Rep. of Germany | 192/87.11 |
| 966355 | 8/1964 | United Kingdom | 192/87.11 |

Primary Examiner—Rodney H. Bonck
Attorney, Agent, or Firm—Donald F. Scherer

[57] ABSTRACT

A clutch assembly has two pistons each having an apply chamber for independently controlling engagement of respective friction plates. An axially fixed wall is disposed adjacent the pistons opposite to the apply chambers. Fluid is admitted between the wall and the pistons such that during rotation of the clutch assembly, centrifugal pressure generated in the fluid in the apply chambers is counteracted by centrifugal pressure generated in the fluid between the wall and the pistons.

3 Claims, 2 Drawing Sheets

CLUTCH ASSEMBLY WITH A PRESSURE BALANCE CHAMBER

BACKGROUND OF THE INVENTION

This invention relates to fluid-operated clutches and more particularly to such clutches having centrifugal pressure balance controls.

Prior art clutches use dump valves to prevent the generation of centrifugal pressure in the rotating clutch when the clutch is disengaged. These arrangements do not provide for counterbalance of the centrifugal pressure when the clutch is engaged. Other clutch assemblies have utilized a mechanical flyweight to counterbalance the centrifugally generated pressures found in the rotation clutches. These systems require accurate calibration and location of the flyweight. These systems also use valuable axial space thereby necessitating increased axial length of the assembly.

SUMMARY OF THE INVENTION

The present invention eliminates the need for dump valves by providing a fluid chamber in which a counterbalancing centrifugal fluid pressure is generated. The use of a counterbalancing fluid chamber also eliminates the need for mechanical flyweights and provides for compatibility between the elements generating the centrifugal forces, thereby reducing or eliminating the calibration requirements. The present invention also permits the counterbalancing of nested pistons so that multiple clutch assemblies can be used in a single rotary hub with the friction plates of the respective clutches being disposed either axially or radially.

It is therefore an object of this invention to provide an improved clutch assembly including two fluid-operated pistons each of which is subject to centrifugally-operated pressure urging clutch engagement and wherein a wall member cooperates with the pistons to form a rotary balancing chamber in which centrifugally generated pressure urges the pistons toward clutch disengagement.

It is another object of this invention to provide an improved multiple clutch assembly including two fluid-operated pistons slidably supported in a rotary housing with one of said pistons being supported at least partially by the other piston, wherein each of said pistons has an apply chamber which is subject to centrifugally generated pressure urging engagement of said clutches and wherein a wall member cooperates with the pistons to form a rotary balancing chamber in which centrifugally generated pressure urges the pistons toward disengagement, and further wherein the pressure in the apply chamber of one of said pistons urges disengagement of the other of said pistons.

These and other objects and advantages of the present invention will be more apparent from the following specification and drawings.

DESCRIPTION OF THE EMBODIMENTS

Figure 1:
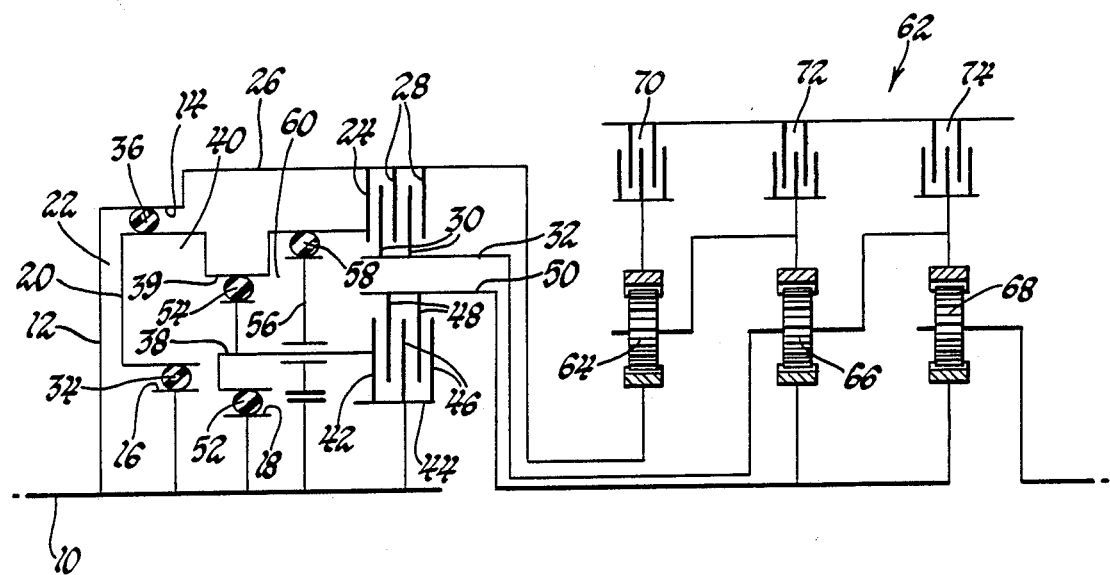
FIG. 1 is a diagrammatic representation of one embodiment of the invention and a planetary gear arrangement which might be used with this invention.

FIG. 1 describes a clutch and planetary gear arrangement wherein an input shaft 10 is drivingly connected to a rotating hub or housing 12 which has an hub outer surface 14 and inner hub surfaces 16 and 18. The outer hub surface 14 and inner hub surface 16 cooperate to slidably support an annular piston 20. The piston 20 and hub 12 cooperate to form an apply chamber 22 which may be selectively pressurized to urge the piston 20 rightward into abutment with a friction plate 24 which is drivingly connected to a portion 26 of the hub 12. The portion 26 also has friction plates 28 drivingly connected thereto. The plates 28 and 24 are alternately spaced by friction plates 30 which are drivingly connected to a hub 32. Piston 20 and hub 12 cooperate with a pair of annular seals 34 and 36 which prevent fluid leakage from the chamber 22.

A second piston 38 is slidably disposed between the inner hub portion 18 and the inner surface 39 of piston 20. The piston 38, piston 20 and hub 12 cooperate to form an apply chamber 40 into which fluid pressure is admitted to cause axial movement of the piston 38. The piston 38 is urged into abutment by fluid pressure with a friction disc 42 which is drivingly connected through a drum 44 with the hub 12 or shaft 10. Also drivingly connected to the drum 44 is a plurality of friction discs 46. Interspersed with the frictions discs 42 and 46 is a plurality of friction discs 48 which are drivingly connected to a hub 50. The piston 38 is sealingly slidably engaged by a pair of annular seals 52 and 54 which prevent leakage of fluid from the chamber 40.

An axially stationary wall 56 is rotatably integral with the hub 12 or input shaft 10 and therefore with the clutch pistons 20 and 38. The wall 56 is sealingly slidably connected with the piston 20 by an annular seal member 58. Low pressure hydraulic fluid, such as lube fluid, is admitted to a chamber 60 formed between the piston 38 and the wall 56. This chamber 60 is also subject to rotation. Thus, the fluid in chamber 60 will have generated therein a centrifugal pressure. This centrifugal pressure will operate to urge the piston 38 leftward, however, the leftward urging will be balanced by the centrifugal pressure generated within the fluid in chamber 40. The centrifugal pressure of the fluid in chamber 40 will operate on the piston 20 to urge leftward movement of piston 20. This leftward urging will be counterbalanced by centrifugal pressure generated in the fluid in chamber 22. Thus, the centrifugal pressures are balanced and the pistons 38 and 20 will not have imposed thereon axial forces resulting from the centrifugal pressures.

The portion 26, hub 32 and hub 50 are connected to components of a planetary gearing arrangement generally designated 62. This planetary gearing arrangement includes three simple planetary sets 64, 66 and 68 which are operatively connected with respective selectively operable brake members 70, 72 and 74 which cooperate with the engagement of the above described clutches to provide six forward speeds and one reverse speed. This planetary gear arrangement is described in U.S. Pat. No. 4,070,927 issued Jan. 31, 1978 in the name of Polak, and assigned to the assignee of the present invention.

Figure 2:
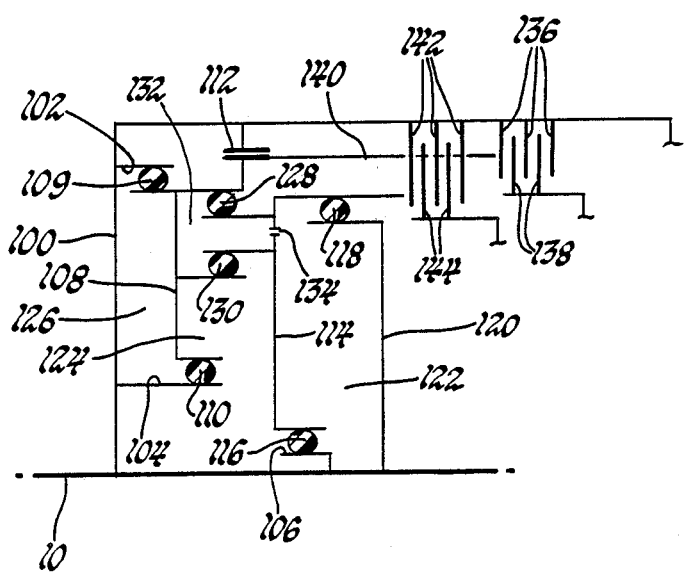
FIG. 2 is a diagrammatic representation of another embodiment of the invention.

The diagrammatic representation shown in FIG. 2 is similar to that described above for FIG. 1. However, the arrangement of FIG. 2 provides for axially disposed friction discs whereas FIG. 1 depicts radially aligned friction discs or packs for the separate clutches.

The multiple clutch assembly of FIG. 2 includes an input shaft 10 to which is rotatably secured a hub 100 having an outer hub surface 102 and a pair of inner hub surfaces 104 and 106. A clutch piston 108 is slidably and sealingly connected with the hub 100 by a pair of annular seals 109 and 110 disposed at the hub surfaces 102 and 104, respectively. The piston 108 is rotatably drivingly connected with the hub 100 at a spline member 112.

A second piston 114 is slidably disposed on the inner hub surface 106 and sealingly engaged by an annular seal member 116. The piston 114 is also sealingly engaged by a seal member 118 disposed on a wall 120 which is axially stationary but rotatably integral with the shaft 10 and hub 100. The wall 120 cooperates with the piston 114 to form a fluid chamber 122 which is supplied with low pressure fluid such as that found in a lubrication system of a transmission. The piston 114 and piston 108 cooperate to form an apply chamber 124 which is supplied with fluid that may be selectively pressurized to cause axial movement of the piston 114.

The piston 108 cooperates with the inner and outer surfaces 102 and 104 and the end wall of hub 100 to form an apply chamber 126 which may be selectively pressurized to cause axial movement of the piston 108. The piston 108 is also slidably sealingly connected by a pair of annular seals 128 and 130 with the piston 114. This arrangement forms a balance chamber 132 which is in fluid communication through a passage 134 with the chamber 122.

The piston 108 is operable to provide engagement of a plurality of friction discs 136 with a plurality of friction discs 138. The piston 108 has a plurality of axial extensions 140 which are operable to abut one of the friction discs 136. The piston 114 is axially slidable to cause frictional engagement between a plurality of friction discs 142 with a plurality of frictions discs 144. The friction discs 142 rotate in unison with the hub 100 as does frictions discs 136, piston 114 and piston 108. The friction discs 142 have circumferentially extending openings which permit the axial extensions 140 of piston 108 to pass through so that abutment with friction discs 136 might occur. The construction of such friction discs and pistons has been utilized in the past and will be familiar to those artisans normally working with clutches and the design thereof. The clutch mechanism shown in FIG. 2 can be utilized with the planetary gearing arrangement shown in FIG. 1 or with many of the other well-known planetary gear arrangements.

Figure 3:
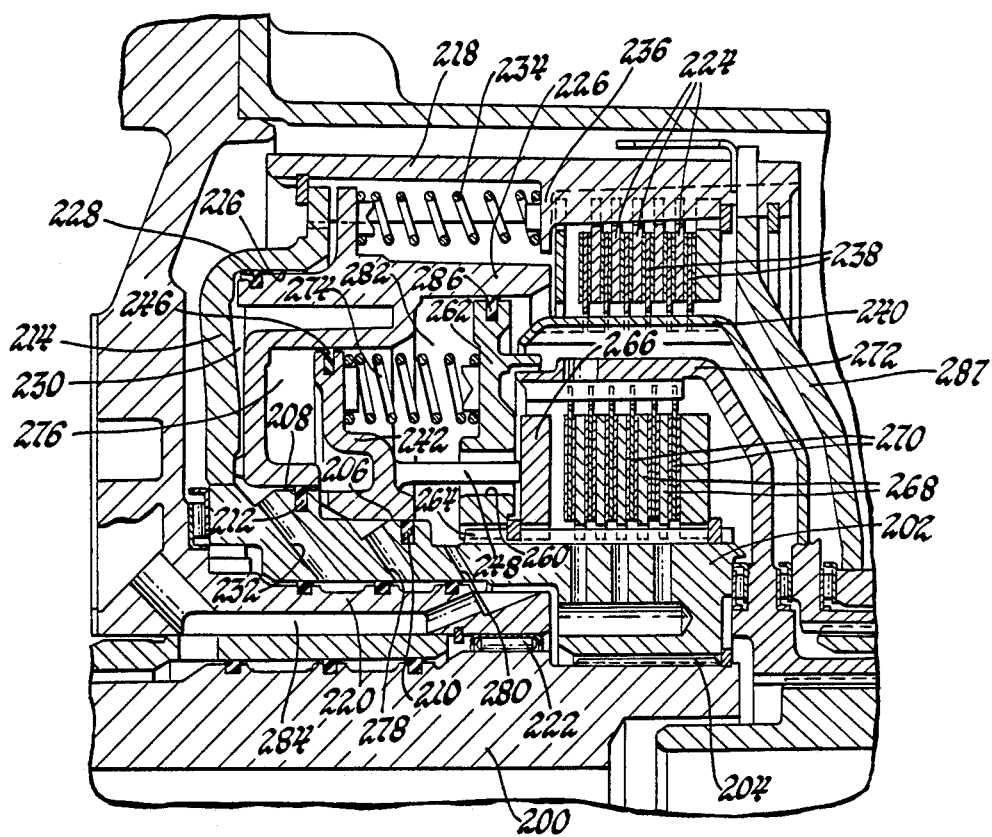
FIG. 3 is a cross-sectional elevational view of a clutch assembly showing an embodiment similar to that of FIG. 1.

FIG. 3 is a cross-sectional elevational view of a portion of a multiple clutch assembly which is similar to that shown in FIG. 1. The assembly of FIG. 3 includes an input shaft 200 to which is drivingly connected a hub 202 through a spline connection 204. The hub 202 has a pair of inner hub surfaces 206 and 208 in which are disposed respective annular seal members 210 and 212. The hub 202 also includes an end wall 214 which has formed therein an outer annular hub surface 216. The hub 202 also includes an outer annular shell 218 which is drivingly connected by a spline connection with the end wall 214. The hub 202 is rotatably supported on a stationary member 220 which also rotatably supports the input shaft 200 through a bearing 222.

The outer shell 218 has splined thereto a plurality of clutch plates 224. The leftmost of these plates 224 is in close proximity with an apply piston 226 which is slidably supported on the seal 212. The piston 226 has disposed thereon a seal 228 which slidably sealingly engages outer annular hub surface 216. The piston 226 cooperates with the end wall 214 to form an apply chamber 230 which is in fluid communication with a fluid passage 232 which permits fluid to be admitted to the apply chamber 230. By selectively pressurizing said fluid, the piston 226 can be moved axially into abutment with the plate 224.

A plurality of spring members, such as 234, are disposed between the piston 226 and a wall 236 formed on the shell 218. These springs urge the piston away from the plate 224 and are commonly referred to as piston return springs.

A plurality of friction discs or plates 238 are disposed intermediate respective pairs of plates 224 thereby forming what is commonly termed a disc pack or clutch pack. The friction plates 238 are splined at their inner diameter with an output hub 240. The piston 226, plates 224, friction plates 238 and hubs 240 and 202 provide what is commonly termed a multi-plate friction clutch.

The seal member 210 and inner hub surface 206 slidably support an annular piston 242. The annular piston 242 has disposed thereon an annular seal 246 which sealingly slidably engages the piston 226. The piston 242 has a plurality of axially extending fingers 248 which extend through respective openings 260 formed in a wall member 262 which is drivingly connected with hub 202 through a spline 264. The fingers 248 are adapted to abut a pressure plate 266 which is drivingly connected with hub 202. A plurality of friction plates or discs 268 are also drivingly connected with the hub 202 and are spaced from each other by a plurality of friction plates or discs 270 which are drivingly connected to a clutch output hub 272.

A plurality of return springs 274 are disposed between the piston 242 and wall 262 which springs urge the piston 242 out of abutment with the pressure plate 266. The piston 242, plates 266, 268 and 270 and hubs 272 and 202 cooperate to form a multi-plate friction clutch. The piston 242 cooperates with the piston 226 and seals 210 and 246 to form a clutch apply chamber 276 which is in fluid communication with a passage 278. Thus, fluid can be admitted to the apply chamber 276 and by selective pressurization thereof the piston 242 can be urged rightward to cause frictional engagement between the plates 268 and 270.

A fluid passage 280 is disposed in fluid communication between a chamber 282 and a lube supply chamber 284. The chamber 282 is formed between the wall 262 and the pistons 226 and 242. An annular seal 286 prevents fluid leakage between the outer surface of the wall 262 and the piston 226. As previously mentioned, the wall 262 is splined to the hub 202 and is therefor rotatably integral therewith.

Whenever the hub 202 is rotated by the input shaft 200, the chambers 230, 276 and 282 will have centrifugally generated fluid pressures formed therein. The pressure in chamber 230 urges the piston 226 rightward toward clutch engagement. This rightwardmost urging is counterbalanced by the pressure in chamber 276 and the pressure in chamber 282 radially outward of seal 246. The fluid pressure in chamber 276 urges the piston 242 rightward toward clutch engagement. This rightward urging is counterbalanced by the fluid pressure in chamber 282 radially outward of the openings 260.

By controlling the diameter at which seal 286 engages and abuts piston 226, and the diameter at which seal 228 abuts surface 216, the piston 226 can be 100% balanced or balanced at a value other than 100%. In some instances, it may be desirable to permit the clutch to engage with increasing force as the speed of rotation increases. However, the percentage of the piston force balanced should be sufficiently great so that clutch drift-on will not occur when clutch disengagement is desired.

The piston 242 is less than 100% balanced. However, 100% balance can be accommodated by placing seals between the openings 260 and the fingers 248, if desired. However, it has been found to be generally satisfactory to provide something less than 100% of centrifugal balance for the piston 242. The return springs 234 and 274 can be utilized to limit the drift-on of the respective pistons 226 and 242 at high rotary speeds.

The shell 218 is drivingly connected to a hub 287 which, in turn, may be connected to a transmission component similar to that shown in FIG. 1. The clutch output hubs 240 and 272 are also connected with transmission components similar to those shown in FIG. 1. The shell 218 does not have to be a positive input drive component to a planetary gearing arrangement, in which case, only the clutches would provide input drives; and a planetary arrangement different from that shown in FIG. 1 would be utilized.

Figure 4:
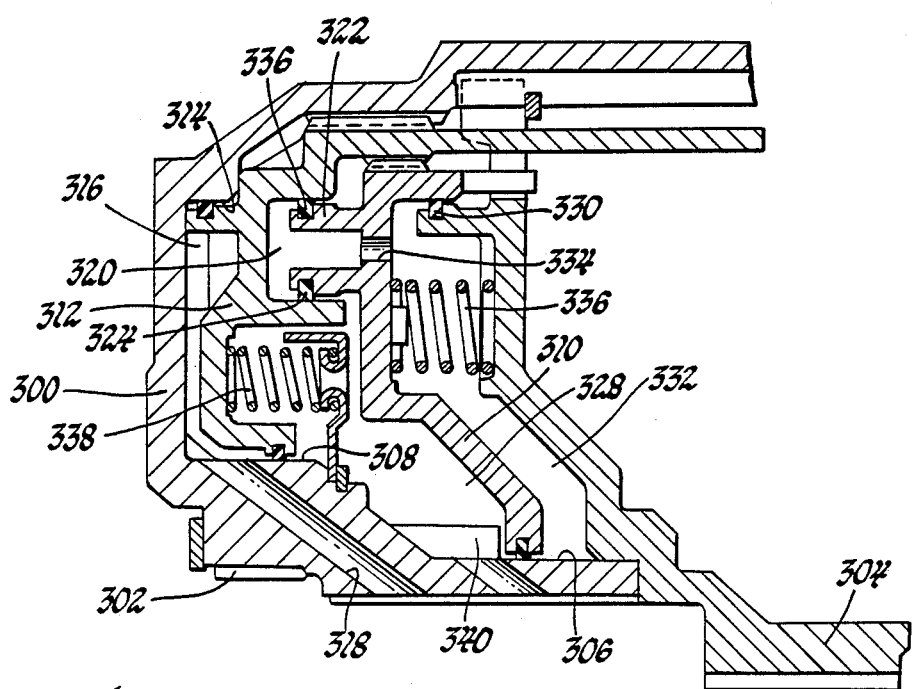
FIG. 4 is a cross-sectional elevational view showing a portion of the clutch assembly utilizing a piston arrangement similar to that shown in FIG. 2.

FIG. 4 depicts a clutch piston arrangement which is similar to the arrangement described above for FIG. 2. In FIG. 4, there is seen an input hub 300 which is drivingly connected to an input shaft, not shown, through a spline 302. Also drivingly connected to the input shaft is a wall member 304. The hub 300 has a pair of inner hub surfaces 306 and 308 on which are slidably disposed a pair of pistons 310 and 312, respectively. The piston 312 also slidably sealingly engages a hub surface 314. A clutch apply chamber 316 is formed between the piston 312 and hub 300 which may be selectively pressurized through a fluid passage 318 to urge rightward movement of the piston 312.

The piston 312 has an annular chamber 320 formed therein in which is slidably disposed an annular extension 322 formed on the piston 310. The annular extension 322 has seals 324 and 326 which sealingly slidably engage the annular surfaces of annular chamber 320. The inner seal 324 delimits the outermost active diameter of piston 310 such that a clutch apply chamber 328 is formed between the piston 310 and the piston 312.

The wall 304 has disposed thereon an annular seal 330 which sealingly slidably engages the piston 310 and cooperates therewith to form a balance chamber 332. The balance chamber 332 is in fluid communication via passage 334 with the chamber 320. The pistons 310 and 312 have associated therewith respective return springs 336 and 338 which operate to urge the pistons in a leftward direction, respectively. A stop surface 340 is formed on the hub 304 to limit the leftward movement of piston 310.

The remaining components of the friction clutches, that is, the friction discs and output hubs have been omitted for clarity. The inclusion of those components is not believed necessary to an understanding of the present invention.

The fluid found in chambers 316, 328, 320 and 332 will be subject to centrifugal pressure generated by the rotation of hub 300 and wall 304. The pressure in chamber 316 urges rightward movement of piston 312 which is counterbalanced by the centrifugal pressure in chamber 320 and chamber 328. The pressure in chamber 328 urges rightward movement of piston 310 which is counterbalanced by the pressure in chamber 332 radially inward of the seal 324. The pressure in chamber 320 urges rightward movement of the piston 310 and is counterbalanced by the pressure in chamber 332 radially outward of the seal 324 and radially inward of the seal 330. The pistons 310 and 312, shown in FIG. 4, are 100% centrifugally pressure balanced. This pressure balance can be adjusted from 100%, by controlling the diameters at which seals 326 and 330 are disposed, if it is found to be desirable to permit increasing clutch engagement with increasing clutch speed.

The nested piston arrangement shown in FIG. 4 can be utilized to control a planetary gearing arrangement such as that shown in FIG. 1 or can be combined with many of the other well-known planetary gearing arrangements to provide a multiple speed transmission.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A clutch assembly in an engine driven power transmission having a rotary input member, said clutch assembly comprising: input hub means drivingly connected with said rotary input member and including an outer hub portion and an inner hub portion; a first piston slidably disposed between said inner hub portion and said outer hub portion and cooperating with said input hub means to define a first clutch apply chamber; a second piston slidably disposed between said first piston and one of said hub portions and cooperating with said first piston and said input hub means to define a second apply chamber; a wall member drivingly connected with said input hub means and sealingly engaging said first piston and cooperating with both said first piston and said second piston to form a balance chamber; means for individually admitting fluid to said first apply chamber, said second apply chamber and said balance chamber, said first and second apply chambers being individually selectively pressurizable to urge said first piston and said second piston, respectively, in an axial direction relative to said input hub means and said fluid in said first and second apply chambers also being subjected to a pressure component proportional to the rotary speed of said rotary input member, said fluid in said balance chamber being subject to pressure proportional to the rotary speed of the rotary input hub means and acting on said second piston to counterbalance fluid pressure therein which is proportional to the rotary speed of the rotary input member, and said pressure in said balance chamber and the fluid pressure in said second apply chamber both acting on said first piston to counterbalance pressure in the fluid in the first apply chamber which is proportional to the rotary speed of the rotary input member whereby the rotary speed created pressure will not affect the axial movement of either the first or second piston.

2. A clutch assembly in an engine driven power transmission having a rotary input member, said clutch assembly comprising: input hub means drivingly connected with said rotary input member and including an outer hub portion and an inner hub portion; a first piston slidably disposed between said inner hub portion and said outer hub portion and cooperating with said input hub means to define a first clutch apply chamber; a second piston slidably disposed between said first piston and one of said hub portions and cooperating with said first piston and said input hub means to define a second apply chamber; a wall member drivingly connected with one of said rotary input member and said input hub means and sealingly engaging said first piston and cooperating with both said first piston and said second piston to form a balance chamber; means for individually admitting fluid to said first apply chamber, said second apply chamber and said balance chamber, said first and second apply chambers being selectively pressurizable to urge said first piston and second piston, respectively, in an axial direction relative to said input hub means and said fluid in said first and second apply chambers also being subjected to a pressure component proportional to the rotary speed of said rotary input member, said fluid in said balance chamber being subject to pressure proportional to the rotary speed of the rotary input hub means and acting on said second piston to counterbalance fluid pressure therein which is proportional to the rotary speed of the rotary input member, and said pressure in said balance chamber and the fluid pressure in said second apply chamber both acting on said first piston to counterbalance pressure in the fluid in the first apply chamber which is proportional to the rotary speed of the rotary input member whereby the rotary speed created pressure will not affect the axial movement of either the first or second piston.

3. A clutch assembly in an engine driven power transmission having a rotary input member, said clutch assembly comprising: input hub means drivingly connected with said rotary input member and including an outer hub portion and an inner hub portion; a first piston slidably disposed between said inner hub portion and said outer hub portion and cooperating with said input hub means to define a first clutch apply chamber; a second piston slidably disposed between said first piston and one of said hub portions and cooperating with said first piston and said input hub means to define a second apply chamber; a wall member drivingly connected with said input hub means and sealingly engaging said first piston and cooperating with both said first piston and said second piston to form a balance chamber; means for individually admitting fluid to said first apply chamber, said second apply chamber and said balance chamber, said first and second apply chambers being individually selectively pressurizable to urge said first piston and said second piston, respectively, in an axial direction relative to said input hub means and said fluid in said first and second apply chambers also being subjected to a pressure component proportional to the rotary speed of said rotary input member, said fluid in said balance chamber being subject to pressure proportional to the rotary speed of the rotary input hub means and reacting to a first balance force on said second piston to counterbalance fluid pressure therein which is proportional to the rotary speed of the rotary input member, and said pressure in said balance chamber and the fluid pressure in said second apply chamber both acting to impose a second balance force on said first piston to counterbalance pressure in the fluid in the first apply chamber which is proportional to the rotary speed of the rotary input member whereby the rotary speed created pressure will not affect the axial movement of either the first or second piston, one of said balance forces being less than 100% of the force necessary to counterbalance the speed proportional pressure in the respective chamber.

* * * * *